US012206813B1

(12) United States Patent
Merkley et al.

(10) Patent No.: US 12,206,813 B1
(45) Date of Patent: Jan. 21, 2025

(54) TECHNIQUES FOR CAMERA PROGRAMMING

(71) Applicant: Vivint, Inc., Provo, UT (US)

(72) Inventors: Logan Sanders Merkley, American Fork, UT (US); Michelle Bea Zundel, Salt Lake City, UT (US)

(73) Assignee: Vivint, Inc, Provo, UT (US)

( * ) Notice: Subject to any disclaimer, the term of this patent is extended or adjusted under 35 U.S.C. 154(b) by 0 days.

(21) Appl. No.: 17/352,025

(22) Filed: Jun. 18, 2021

(51) Int. Cl.
*H04M 1/72406* (2021.01)
*G06F 3/0482* (2013.01)
*G08B 13/196* (2006.01)
*H04W 4/20* (2018.01)
*H04W 4/50* (2018.01)

(52) U.S. Cl.
CPC ...... *H04M 1/72406* (2021.01); *G06F 3/0482* (2013.01); *G08B 13/19682* (2013.01); *G08B 13/19684* (2013.01); *H04W 4/20* (2013.01); *H04W 4/50* (2018.02)

(58) Field of Classification Search
CPC ....... G08B 13/19682; G06B 13/19684; H04M 1/72406; H04W 4/20; H04W 4/50
See application file for complete search history.

(56) References Cited

U.S. PATENT DOCUMENTS

| | | | |
|---|---|---|---|
| 6,397,334 B1 * | 5/2002 | Chainer | G01S 17/88 713/168 |
| 6,654,732 B1 | 11/2003 | Naito et al. | |
| 6,748,343 B2 | 6/2004 | Alexander et al. | |
| 7,193,644 B2 | 3/2007 | Carter | |
| 7,956,739 B2 | 6/2011 | Hong et al. | |
| 8,139,095 B2 | 3/2012 | Carter | |
| 8,144,183 B2 | 3/2012 | Carter | |
| 8,144,184 B2 | 3/2012 | Carter | |
| 8,154,581 B2 | 4/2012 | Carter | |
| 8,164,614 B2 | 4/2012 | Carter | |
| 8,516,087 B2 | 8/2013 | Wilson et al. | |

(Continued)

OTHER PUBLICATIONS

Hossain et al., "Adaptive Interaction Support in Ambient-Aware Environments Based on Quality of Context Information" in Multimed tools Appl (2013) 67: pp. 409-432 (Year: 2013).

(Continued)

*Primary Examiner* — Andrea C Leggett
(74) *Attorney, Agent, or Firm* — Nolte Lackenbach Siegel

(57) ABSTRACT

Methods, systems, and devices for intruder detection are described. A security and automation system may include a camera configured to monitor a zone of a premises. The security and automation system may detect a person in the zone, for example using the camera, a motion sensor, or another sensor. The security and automation system may determine that the person has remained in the zone for a threshold duration. The security and automation system may generate a notification (e.g. an audiovisual notification) based on determining that the person has remained in the zone for the duration. In some examples, the notification may include a verbal message, a flashing light, etc., to indicate to the person that video recording was initiated. The techniques described herein may inform an intruder that video is being recorded, which may discourage an intruder from an intended action (e.g., theft, property damage, etc.), among other benefits.

20 Claims, 9 Drawing Sheets

(56) References Cited

U.S. PATENT DOCUMENTS

| | | |
|---|---|---|
| 9,160,987 B1 | 10/2015 | Kasmir et al. |
| 9,414,030 B2 | 8/2016 | Carter |
| 9,432,638 B2 | 8/2016 | Carter |
| 9,485,478 B2 | 11/2016 | Carter |
| 9,516,284 B2 | 12/2016 | Carter |
| 9,648,290 B2 | 5/2017 | Carter |
| 9,653,323 B2 | 5/2017 | Chew et al. |
| 10,075,828 B2 | 9/2018 | Horton et al. |
| 10,117,309 B1 | 10/2018 | Fu et al. |
| 10,674,120 B2 | 6/2020 | Carter |
| 10,986,717 B1 | 4/2021 | Fu et al. |
| 11,195,398 B1 | 12/2021 | Fu et al. |
| 11,581,099 B1 | 2/2023 | Rufo et al. |
| 2002/0070859 A1 | 6/2002 | Gutta et al. |
| 2002/0086660 A1 | 7/2002 | Sullivan et al. |
| 2003/0117280 A1 | 6/2003 | Prehn |
| 2003/0118216 A1 | 6/2003 | Goldberg |
| 2005/0176400 A1 | 8/2005 | Mullet et al. |
| 2005/0281435 A1 | 12/2005 | Aggarwal |
| 2006/0041500 A1 | 2/2006 | Diana et al. |
| 2009/0048859 A1 | 2/2009 | McCarthy et al. |
| 2009/0299825 A1 | 12/2009 | Olawski et al. |
| 2009/0299854 A1 | 12/2009 | Olawski et al. |
| 2010/0082174 A1 | 4/2010 | Weaver et al. |
| 2010/0289643 A1 | 11/2010 | Trundle et al. |
| 2011/0054973 A1 | 3/2011 | Deich et al. |
| 2012/0023145 A1 | 1/2012 | Brannon et al. |
| 2012/0284777 A1 | 11/2012 | Eugenio et al. |
| 2012/0316690 A1 | 12/2012 | Li et al. |
| 2014/0015981 A1 | 1/2014 | Dietl |
| 2014/0266681 A1 | 9/2014 | Small |
| 2014/0278028 A1* | 9/2014 | Nye .................. G01C 21/3676 701/117 |
| 2014/0282048 A1 | 9/2014 | Shapiro et al. |
| 2014/0324192 A1 | 10/2014 | Baskaran et al. |
| 2015/0039105 A1 | 2/2015 | Lee et al. |
| 2015/0088329 A1 | 3/2015 | Thiruvengada et al. |
| 2015/0108901 A1 | 4/2015 | Greene et al. |
| 2015/0228419 A1 | 8/2015 | Fadell et al. |
| 2015/0296187 A1* | 10/2015 | Baldwin ............... G06F 3/0484 348/143 |
| 2015/0350612 A1* | 12/2015 | Brunson ................ H04N 23/50 348/143 |
| 2016/0142407 A1 | 5/2016 | Chun et al. |
| 2016/0261425 A1* | 9/2016 | Horton ................ H04L 67/1097 |
| 2016/0274230 A1 | 9/2016 | Wu et al. |
| 2016/0350654 A1 | 12/2016 | Lee et al. |
| 2017/0262706 A1 | 9/2017 | Sun et al. |
| 2018/0035901 A1 | 2/2018 | Cronin et al. |
| 2018/0047274 A1 | 2/2018 | Miwa |
| 2018/0114420 A1 | 4/2018 | Siminoff et al. |
| 2018/0165933 A1 | 6/2018 | Siminoff |
| 2018/0189913 A1 | 7/2018 | Knopp et al. |
| 2018/0240454 A1 | 8/2018 | Raj et al. |
| 2018/0294047 A1 | 10/2018 | Hosseini et al. |
| 2018/0341835 A1 | 11/2018 | Siminoff |
| 2019/0087646 A1 | 3/2019 | Goulden et al. |
| 2019/0108404 A1 | 4/2019 | Xu |
| 2019/0156601 A1 | 5/2019 | Sinha et al. |
| 2019/0320515 A1 | 10/2019 | Sadwick |
| 2019/0327448 A1 | 10/2019 | Fu et al. |
| 2020/0180506 A1 | 6/2020 | Nakayama et al. |
| 2021/0056184 A1 | 2/2021 | Modani et al. |
| 2022/0165036 A1* | 5/2022 | Daley .................... H04L 67/51 |

OTHER PUBLICATIONS

Unboxing the Ring Video Dorrbell is it Worth it video.

* cited by examiner

TECHNIQUES FOR CAMERA PROGRAMMING

FIELD OF DISCLOSURE

The present disclosure, for example, relates to security and automation systems, and more particularly to techniques for camera programming in security and automation systems.

BACKGROUND

Security and automation systems are widely deployed in a smart environment (e.g., a residential, a commercial, or an industrial setting) to provide various types of communication and functional features such as monitoring, communication, notification, among other examples. These systems may be capable of supporting communication with a person through a communication connection or a system management action. Some security and automation systems may include sensors for monitoring a home or a commercial business. These systems typically employ sensors at entry and exit points, along with interior sensors (e.g., motion detectors, sound sensors, and glass break sensors) for determining entry or exit into or out of a property. As demand for reliability of security and automation systems increases, some security and automation systems may fail to provide satisfactory detection and other classifications of persons within or relative to the physical environment, and thereby may be unable to support reliable security operations.

SUMMARY

Various aspects of the present disclosure relate to enabling a computing device associated with a security and automation system to program a device in electronic communication with a security and automation system using a madlib style format. The device may be a camera-enabled device, such as a standalone camera or a non-standalone camera. For example, the camera-enabled device may be a smart outdoor camera (ODCP) for monitoring, detection, communication, notification, among other examples. A user may program the device by selecting fields on a user interface of the computing device. For example, the computing device may be a smartphone or a control panel, which may execute an application that allows the smartphone or the control panel to communicate with the device. With reference to the user interface, a user may select a field to view options for modifying one or multiple settings for the device. The listed options for a field may be based on available products for the device. In some examples, the fields may be bold, highlighted, or otherwise different from surrounding texts or objects to indicate that the field is selectable or editable. As a result, the user interface may enable a user to efficiently program custom rules and settings for the device.

A method for programming a device associated with a security and automation system is described. The method may include determining a format for programming the device, outputting, via an interface of the computing device, a representation of the format, the format including a first set of fields and a second set of fields including one or more selectable options for each field of the second set of fields, receiving, via the interface of the computing device, one or more inputs corresponding to the one or more selectable options for each field of the second set of fields, and transmitting instructions to the device for programming the device based on the one or more inputs.

An apparatus for programming a device associated with a security and automation system is described. The apparatus may include an interface, a processor, memory coupled with the processor, and instructions stored in the memory. The instructions may be executable by the processor to cause the apparatus to determine a format for programming the device, output, via the interface, a representation of the format, the format including a first set of fields and a second set of fields including one or more selectable options for each field of the second set of fields, receive, via the interface, one or more inputs corresponding to the one or more selectable options for each field of the second set of fields, and transmit instructions to the device for programming the device based on the one or more inputs.

A non-transitory computer-readable medium storing code for programming a device associated with a security and automation system is described. The code may include instructions executable by a processor to determine a format for programming the device, output, via an interface of the computing device, a representation of the format, the format including a first set of fields and a second set of fields including one or more selectable options for each field of the second set of fields, receive, via the interface of the computing device, one or more inputs corresponding to the one or more selectable options for each field of the second set of fields, and transmit instructions to the device for programming the device based on the one or more inputs.

Some examples of the method, apparatus, and non-transitory computer-readable medium described herein may further include operations, features, means, or instructions for identifying one or more peripheral devices associated with programming the device, where outputting the representation of the format may be based on identifying the one or more peripheral devices.

In some examples of the method, apparatus, and non-transitory computer-readable medium described herein, the one or more peripheral devices include a camera sensor, a motion sensor, a speaker, a control panel, a transceiver, a doorbell, a light, a car guard device, a laser tripline, a smart security sign, or any combination thereof.

Some examples of the method, apparatus, and non-transitory computer-readable medium described herein may further include operations, features, means, or instructions for receiving, from the device, a response based on the transmitted instructions and providing, at the computing device, a notification based on the received response.

In some examples of the method, apparatus, and non-transitory computer-readable medium described herein, the notification includes an updated representation of the format at the interface of the computing device, the updated representation based on the received response.

In some examples of the method, apparatus, and non-transitory computer-readable medium described herein, the notification includes a text message, a confirmation message, an audio message, a visual notification, or any combination thereof.

In some examples of the method, apparatus, and non-transitory computer-readable medium described herein, a text format of the second set of fields in the representation of the format indicates the second set of fields may be selectable or editable.

In some examples of the method, apparatus, and non-transitory computer-readable medium described herein, the second set of fields may be associated with an object detection mode, a deterrence mode, a duration, an alarm tone, a light pattern, a schedule, an initiated action at a component of the security and automation system, or any combination thereof.

In some examples of the method, apparatus, and non-transitory computer-readable medium described herein, the device includes a camera-enabled device configured for monitoring, detection, deterrence, recording, communication, notification, or any combination thereof.

In some examples of the method, apparatus, and non-transitory computer-readable medium described herein, the camera-enabled device may be positioned on an exterior surface of a building.

In some examples of the method, apparatus, and non-transitory computer-readable medium described herein, the device may include a door lock, a security sensor, a thermostat, a garage door opener, or any combination thereof.

In some examples of the method, apparatus, and non-transitory computer-readable medium described herein, the computing device includes a smartphone and the representation of the format may be provided using an application at the smartphone.

DETAILED DESCRIPTION

Figure 1:
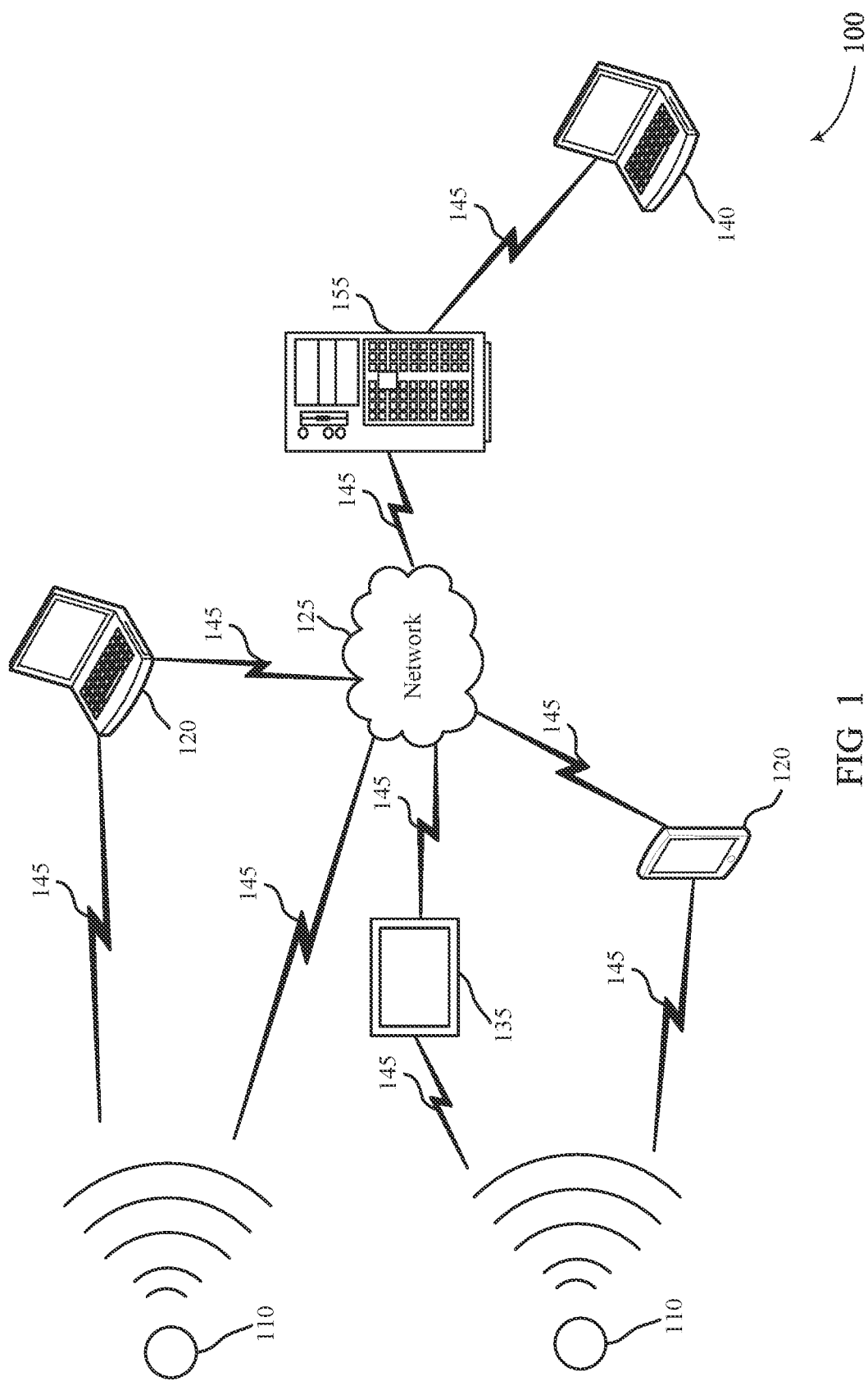
FIG. 1 illustrates an example of a system that supports techniques for camera programming in accordance with aspects of the present disclosure.

Some security and automation systems, such as for homes and commercial businesses have become commonplace as people seek to guard themselves and their property. These security and automation systems may employ sensors at entry and exit points, along with interior sensors (e.g., motion detectors, sound sensors, and glass break sensors) for determining entry or exit into or out of a property. In addition, these security and automation systems may employ security cameras that perform various operations related to crime or other circumstances. Various aspects of the present disclosure relate to controlling sensors and other devices at a home or business based on user preferences. The term "home" used throughout the present disclosure generically refers to any dwelling or property that is monitored by a monitoring system, such as a security and automation system. The term "security and automation system" may be used herein to describe a security system, an automation system, a smart home security and automation system, which may provide automation and/or security functionality.

Some sensors of a security and automation system may be configured to monitor a zone of a premises. For example, a camera may be mounted such that the camera may capture images of a driveway, a yard, a porch, etc. The camera may include or be in communication with a motion sensor for detecting movement within the zone. The security and automation system may detect a person in the zone, for example using the camera, the motion sensor, or another sensor. In some examples, the sensors of the security and automation system may be configured to detect a presence of a person at or near a residence. For example, the security and automation system may detect the presence of the person based on detecting and analyzing sounds occurring on or near the residence. In some cases, the security and automation system may detect motion proximate the residence, and may analyze the detected motion to infer that a person is present near the residence. That is, the security and automation system may include analytics to distinguish motion associated with a person from other motion (e.g., an animal, trees blowing in the wind, among other examples).

According to some aspects of the present disclosure, the security and automation system can be implemented to perform tasks that are responsive to the detected movement or presence. For example, upon detecting movement, the camera may be configured to begin recording video. However, configuring the camera or other devices or sensors of the security and automation system may be limited to operating a control panel. Additionally, a user interface at the control panel may be complicated to navigate to configure devices and sensors for cooperative operation.

Various aspects of the present disclosure relate to enabling a computing device (e.g., a smartphone) to program a device in electronic communication with a security and automation system using a madlib style format. The device may be a camera-enabled device, such as a standalone camera or a non-standalone camera. For example, the camera-enabled device may be an ODCP for monitoring, detection, communication, notification, among other examples. A user may program the device by selecting fields on a user interface of the computing device. For example, a smartphone may execute an application that allows the smartphone to communicate with the device. With reference to the user interface, a user may select a field to view options for modifying one or more settings for the device. The listed options for a field may be based on what products are available to the user for the device. In some examples, the fields may be bold, highlighted, or otherwise different from surrounding text to indicate that the field is selectable or editable. By enabling the madlib style format programming for the in electronic communication with a security and automation system, the user interface may enable a user to efficiently program custom rules for the device. Additionally, by enabling efficient programming, the device may experience reduced power consumption. For example, the efficient programming may reduce a period during which the device is in active communication with the security and automation system. As such, the device may return to a low power mode.

Aspects of the disclosure are initially described in the context of security and automation systems. Aspects of the disclosure are further illustrated by and described with reference to a security and automation environment, a user interface, and a process flow. Aspects of the disclosure are further illustrated by and described with reference to apparatus diagrams, system diagrams, and flowcharts that relate to techniques for camera programming. The present disclosure provides examples and is not limiting of the scope, applicability, or examples set forth in the claims. Changes may be made in the function or arrangement of elements discussed without departing from the scope of the present disclosure. Various examples may omit, substitute, or add various procedures or components as appropriate. For example, the methods described may be performed in an order different from that described, or various steps may be added, omitted, or combined. Also, features described with respect to some examples may be combined in other examples.

FIG. 1 illustrates an example of a system 100 that supports techniques for camera programming in accordance with aspects of the present disclosure. The system 100 may be an example of a security and automation system. The system 100 may include one or more sensor units 110, one or more local computing devices 120, control panel 135, remote computing device 140, and server 155. The network 125 may provide personal authentication credentials, encryption, access authorization, tracking, Internet Protocol (IP) connectivity, and other access, computation, modification, and/or functions. The control panel 135 may interface with the network 125 through a first set of wired and/or wireless communication links 145 to communicate with the server 155. The control panel 135 may perform communication configuration, adjustment, and/or scheduling for communication with the local computing device 120 and remote computing device 140, or may operate under the control of a controller. Control panel 135 may communicate with a back-end server (such as the server 155)—directly and/or indirectly—using the first set of one or more wireless communication links 145. In some examples, the server 155 may be a remote server located at a location different or same from the control panel 135, the local computing device 120, and/or the remote computing device 140.

The control panel 135 may wirelessly communicate with the remote computing device 140 and the local computing device 120 by way of one or more antennas. The control panel 135 may provide communication coverage for a respective coverage area (e.g., residential, commercial). In some examples, the control panel 135 may be referred to as a control device, a controller, a base transceiver station, a radio base station, an access point, a radio transceiver, or some other suitable terminology. The coverage area for a control panel 135 may be divided into sectors making up only a portion of the coverage area. The security and automation system 100 may include control panels of different types. In some examples, the security and automation system 100 may include overlapping coverage areas for one or more different parameters, including different technologies, features, subscriber preferences, hardware, software, technology, and/or methods.

For example, one or more control panels may be related to one or more discrete structures (e.g., a house, a business) and each of the one more discrete structures may be related to one or more discrete areas (e.g., multiple houses in a neighborhood). In other examples, multiple control panels may be related to the same one or more discrete structures (e.g., multiple control panels relating to a house and/or a business complex). For example, one or more control panels may be located within a house. Additionally or alternatively, each room within the house may have a designated control panel located within each room. In some cases, the one or more control panels may communicate with one another via one or more communication protocols. In some examples, the one or more control panels may form a mesh network within the house and communicate with one another via the mesh network. In some examples, a control panel may modify or update a security parameter based on information received from one or more other control panels in the mesh network.

The local computing device 120 or remote computing device 140 may be dispersed throughout the security and automation system 100. In some examples, the local computing device 120 and/or remote computing device 140 may be stationary and/or mobile. In some examples, the local computing device 120 and/or remote computing device 140 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors), a printer, a camera, and/or the like. The local computing device 120 and/or remote computing device 140 may, additionally or alternatively, include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

In some examples, control panel 135 may be a smart home system panel, for example, an interactive panel mounted on a wall or other surface in a person's home. Control panel 135 may be in direct communication via wired or wireless communication links 145 with the one or more sensor units 110, or may receive sensor data from the one or more sensor units 110 via local computing device 120 and network 125, or may receive data via remote computing device 140, server 155, and network 125. Additionally or alternatively, the control panel 135 may wirelessly communicate with the sensor units 110 via one or more antennas. The sensor units 110 may be dispersed throughout the security and automation system 100 and each sensor unit 110 may be stationary and/or mobile. Sensor units 110 may include and/or be one or more sensors that sense: proximity, motion, temperatures, humidity, sound level, smoke, structural features (e.g., glass breaking, window position, door position), time, light, geo-location data of a person and/or a device, distance, biometrics, weight, speed, height, size, preferences, light, darkness, weather, time, system performance, and/or other inputs that relate to a security and/or an automation system.

The local computing device 120, remote computing device 140, and/or a sensor units 110 may be able to communicate through one or more wired and/or wireless connections with various components such as a control panel, base stations, and/or network equipment (e.g., servers, wireless communication points) and/or the like. In some examples, one or more sensor units 110 may be located within a structure, e.g., house. Additionally or alternatively, in some examples, the structure may have a designated sensor unit located within one or more predetermined areas, e.g., rooms. In some cases, the one or more sensor units 110 may communicate with one another via one or more communication protocols. In some examples, the one or more sensor units 110 may form a mesh network within the structure and communicate with one another via the mesh network. In some examples, the mesh network associated with the sensor units 110 may be different or be a part of a mesh network associated with one or more control panels.

The wireless communication links 145 shown in the security and automation system 100 may include uplink (UL) transmissions from a local computing device 120 to a control panel 135, and/or downlink (DL) transmissions, from a control panel 135 to the local computing device 120. The downlink transmissions may also be called forward link transmissions while the uplink transmissions may also be called reverse link transmissions. Wireless communication links 145 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels), overhead information, user data, etc. The wireless communication links 145 may transmit bidirectional communications and/or unidirectional communications. Wireless communication links 145 may include one or more connections, including but not limited to, 345 MHz, Wi-Fi, BLUETOOTH®, BLUETOOTH® Low Energy, cellular, Z-WAVE®, 802.11, peer-to-peer, LAN, wireless local area network (WLAN), Ethernet, FireWire®, fiber optic, and/or other connection types related to security and/or automation systems.

In some examples, of the security and automation system 100, control panel 135, local computing device 120, and/or remote computing device 140 may include one or more antennas for employing antenna diversity schemes to improve communication quality and reliability between control panel 135, local computing device 120, and remote computing device 140. Additionally or alternatively, control panel 135, local computing device 120, and/or remote computing device 140 may employ multiple-input, multiple-output (MIMO) techniques that may take advantage of multi-path, mesh-type environments to transmit multiple spatial layers carrying the same or different coded data.

While the local computing device 120 and/or remote computing device 140 may communicate with each other through the control panel 135 using wireless communication links 145, the local computing device 120 and/or remote computing device 140 may also communicate directly with one or more other devices via one or more direct communication links (not shown). Examples of direct communication links may include Wi-Fi Direct, BLUETOOTH®, wired, and/or, and other P2P group connections. The control panel 135, local computing device 120, and/or remote computing device 140 in these examples may communicate according to the WLAN radio and baseband protocol including physical and medium access control (MAC) layers from Institute of Electrical and Electronics Engineers (IEEE) 802.11, and its various versions including, but not limited to, 802.1 Tb, 802.11g, 802.11a, 802.11n, 802.11ac, 802.11ad, 802.11ah, etc. In other implementations, other peer-to-peer connections and/or ad hoc networks may be implemented within security and automation system 100.

In an example, local computing device 120 and remote computing device 140 may be custom computing entities configured to interact with sensor units 110 via network 125, and in some examples, via server 155. In other examples, local computing device 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules. The local computing device 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some examples, the local computing device 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing device 120 may be operable to control operation of the output of the local computing device 120. The output may be a television, a liquid crystal display (LCD) monitor, a cathode ray tube (CRT) monitor, speaker, tactile output device, and/or the like. In some examples, the output may be an integral component of the local computing device 120. Similarly, the output may be directly coupled with the processor. For example, the output may be the integral display of a tablet and/or smart phone. In some examples, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing device 120 to the output.

The remote computing device 140 may be a computing entity operable to enable a remote person to monitor the output of the sensor units 110. The remote computing device 140 may be functionally and/or structurally similar to the local computing device 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and server 155.

In some examples, the sensor units 110 may be sensors configured to conduct periodic or ongoing automatic measurements related to detecting an occurrence of an event. In some examples, the sensor units 110 may be configured to determine presence, occupancy, identity, and location based on a received request. Each sensor unit 110 may be capable of sensing multiple identification and/or location determining parameters, or alternatively, separate sensor units 110 may monitor separate identification and/or location determining parameters. For example, one sensor unit 110 may determine an identity of a person, while another sensor unit 110 (or, in some examples, the same sensor unit 110) may detect an occupancy of and/or location of the person.

In some examples, the sensor units 110 may be separate from the control panel 135 and may be positioned at various locations throughout the house or the property. In other examples, the sensor units 110 may be integrated or collocated with other house and/or building automation system components, home appliances, and/or other building fixtures. For example, a sensor unit 110 may be integrated with a doorbell or door intercom system, or may be integrated with a front entrance light fixture. In other examples, a sensor unit 110 may be integrated with a wall outlet and/or switch. In other examples, the sensor units 110 may be integrated and/or collocated with the control panel 135 itself. In some examples, each of the sensor units 110, control panel 135, and/or local computing device 120 may include a speaker unit, a microphone unit, and/or a camera unit, among other things.

In some cases, a property may be monitored by the control panel 135 and/or sensor units 110. In some examples, the control panel 135 may include sensor units 110 such that the control panel 135 may directly receive signals (e.g., motion sensed, entry/exit detected) associated with the property. Each sensor unit 110 may be capable of sensing multiple occupancy parameters, or alternatively, separate sensor units may monitor separate occupancy parameters. For example, one sensor unit may be a motion sensor, while another sensor unit may detect security parameters by monitoring vibration or audio. In some cases, sensor units 110 may additionally monitor alternate security and occupancy parameters, for example by monitoring heartbeat or breathing. In some examples, occupancy may be detected by any one of a motion sensor, audio sensor, radio frequency identification (RFID) sensor, video camera, light-break sensor, or a combination thereof. In some examples, the sensor units 110 may be separate from the control panel 135, and may be positioned at various locations, also referred to herein as zones, throughout a property. In other examples, the sensor units 110 may be integrated or collocated with other security and automation system components. For example, a sensor unit 110 may be integrated with a wall, door, window for detecting entry and/or exit of a person relative to the property. In other examples, the sensor units 110 may be integrated or collocated with the control panel 135 itself.

In some cases, the control panel 135 in communication with the sensor units 110 may receive sensor data associated with at least one sensor of a home automation system. In some examples, the control panel 135 may receive a trigger to perform a security function associated with a home automation system. In some examples, the security function may be instructions to arm or disarm a property (i.e., activate alarm parameters). After receiving the instructions, the control panel 135 may determine one or more settings associated with the security and automation system 100. In some examples, the security and/or automation system 100 may be referred to as a home automation system.

In some examples, one or more sensor units 110 may be configured to monitor a zone of a premises. For example, a camera may be mounted such that the camera may capture images of a driveway, a yard, a porch, etc. The camera may include or be in communication with a motion sensor for detecting movement within the zone. According to some aspects of the present disclosure, the system and methods can be implemented to perform tasks that are responsive to the detected movement. For example, upon detecting movement, the camera may be configured to begin recording video.

A computing device (e.g., a remote computing device 140 or a local computing device 120) may program a device of the system 100 using a madlib style format. In some examples, the device may include one or more sensor units 110. For example, the device may be a camera-enabled device such as a standalone camera or a non-standalone camera. A user may program the device by selecting fields on a user interface of the computing device. For example, a smartphone may execute an application that allows the smartphone to communicate with the device. With reference to the user interface, a user may select a field to see options for modifying one or more settings for the device. In some examples, the listed options for a field may be based on what products are available to the user for the device, including components such as sensor units 110 of the system 100. In some examples, the fields may be bold, highlighted, or otherwise different from surrounding text to indicate that the field is selectable or editable. Accordingly, the user interface may enable a user to efficiently program custom rules for the device.

Figure 2:
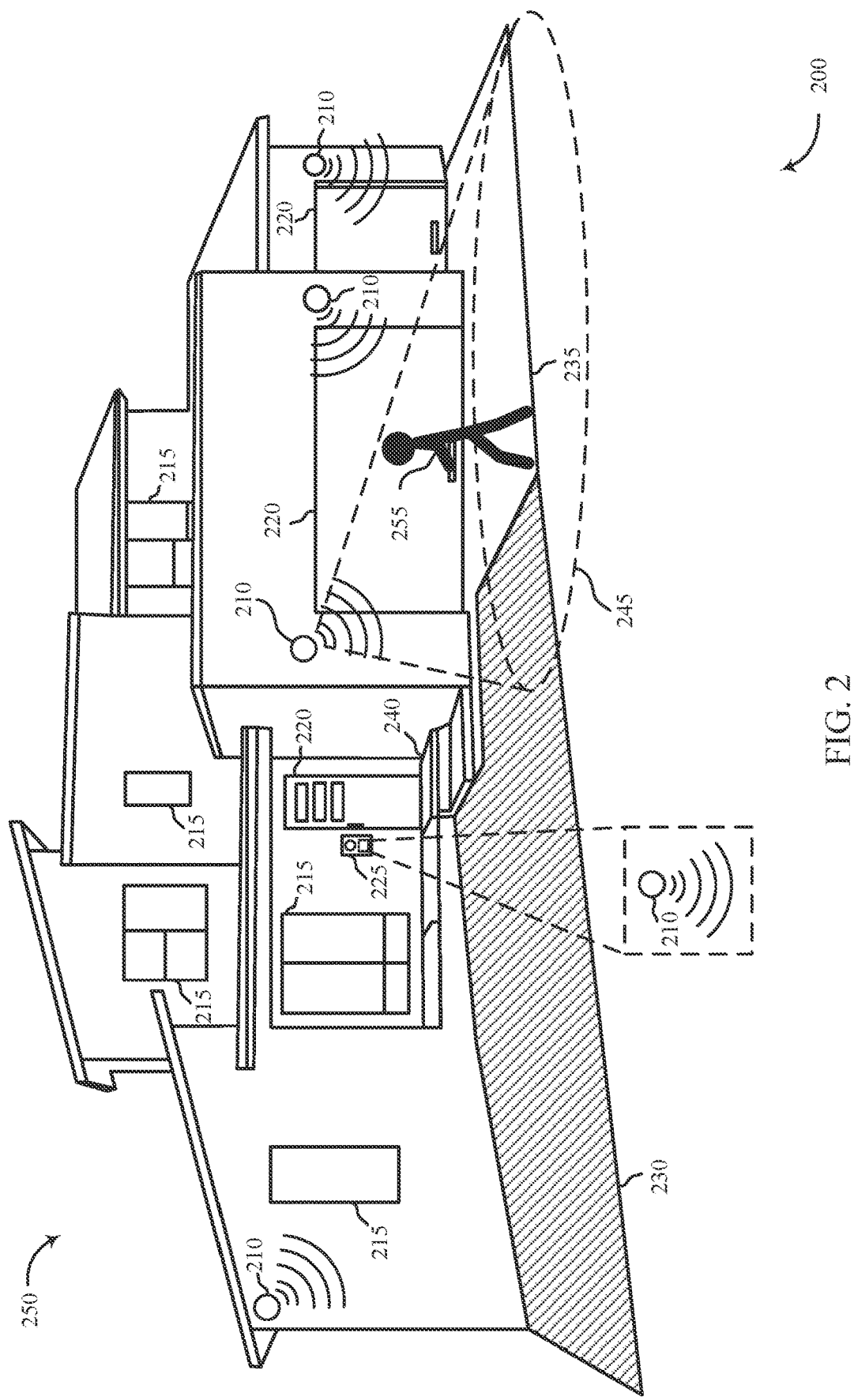
FIG. 2 illustrates an example of a security and automation environment that supports techniques for camera programming in accordance with aspects of the present disclosure.

FIG. 2 illustrates an example of a security and automation environment 200 that supports techniques for camera programming in accordance with aspects of the present disclosure. In some examples, the security and automation environment 200 may implement aspects of the system 100. The security and automation environment 200 may include one or more sensor units 210 and one or more access points 215 and one or more access points 220. For example, the access points 215 may include windows of a home 250, and the access points 220 may include doors (e.g., an entrance door, a garage door, etc.) to a home 250. In some examples, the home 250 may include a porch 240.

One or more sensor units 210 may include one or more examples of sensor units 110 as described in FIG. 1. The one or more sensor units 210 may be installed, mounted, or integrated with one or more of the access points 215 and the access points 220, or alternatively with an interior and/or an exterior surface of the home 250. In some examples, one or more sensor units 210 may be installed, mounted, or integrated with a doorbell 225. The one or more sensor units 210 may monitor an exterior or an interior of the home 250. In some examples, the one or more sensor units 210 may monitor a yard 230 and/or a driveway 235 adjacent to the home 250.

The home 250 may include one or more zones. In one example, a zone of the home 250 may be a bedroom, living room, etc., of the home 250. The zone may also include a floor and a ceiling. In some examples, the zone may include one or more sensors units 210 (not shown) or devices installed, mounted, or integrated with the zone 205. For example, the zone may have a motion sensor (such as sensor 210) installed or mounted on a wall of the zone. The motion sensor may detect whether the zone is occupied, and report collected sensor data to a control panel. In some examples, the zone may include an access point 215 and an access point 220. The access point 220 may include a door or be an open entry. Additionally or alternatively, the access point 215 may include a window. In some examples, the zone may include a lock component. For instance, the access point 220 may include a lock component, while the access point 215 may be absent of a lock component, e.g., when the access point 220 is an open entry-way.

The home 250 may include a security and automation system (e.g., the system 100) configured to detect intruders, among other benefits. Although not depicted herein, the home 250 may include a control panel, which may be one or more examples of a control panel 135 as described in FIG. 1. The control panel may be a smart home system panel, for example, an interactive panel mounted on a wall of the security and automation environment 200. In some examples, the control panel may be in direct communication via wired or wireless communication links with one or more sensor units 210, may receive sensor data from the one or more sensor units 210. In some examples, the control panel 135 may communicate and receive data periodically or continuously from the sensor units 210. The control panel and the one or more sensor units 210 may communicate according to a radio access technology (RAT) such as 5G New Radio (NR) RAT, Long Term Evolution (LTE), IEEE 802.11 (Wi-Fi), IEEE 802.16 (WiMAX), near-field communication (NFC), ZigBee protocol, among others.

One or more of the sensor units 210 may include cameras configured to detect an intruder. For example, a user of the security and automation system may initiate a mode (e.g., an "away" mode) which includes an increased sensitivity for detecting individuals in the security and automation environment 200. Each camera may monitor a zone 245 of the security and automation environment 200. Each monitored zone may be within a field of view of the associated camera. For example, a sensor unit 210 may be configured to monitor a zone 245 including the driveway 235. Additionally or alternatively, one or more sensor units 210 may monitor additional zones 245 (not shown) of the security and automation environment 200 which may include at least a portion of the yard 230, at least a portion of the porch 240, or a combination thereof. In some examples, the zones 245 monitored by the sensor units 210 may overlap (e.g., to avoid blind spots or unmonitored areas in the security and automation environment 200).

One or more sensor units 210 may detect a presence of one or more objects in a monitored zone 245. For example, a camera or a motion sensor of a sensor unit 210 may detect movement within the zone 245. In one example, the one or more sensor units 210 may be configured to determine whether the presence is a person 255 or another object (e.g., a vehicle) or an animal based on one or more characteristics of the presence. For example, one or more sensor units 210 may be configured to recognize a face, a gait, a size, a shape, a speed of motion, etc., which may identify the presence as a person 255.

According to one or more aspects of the present disclosure, a computing device (e.g., a remote computing device 140 or a local computing device 120 as described with reference to FIG. 1) may program a device of the security and automation environment 200 using a madlib style format. In some examples, the device may include one or more sensor units 210. For example, the device may be a camera-enabled device such as a standalone camera or a non-standalone camera. A user may program the device by selecting fields on a user interface of the computing device. For example, a smartphone may execute an application that allows the smartphone to communicate with the device. With reference to the user interface, a user may select a field to see options for modifying one or more settings for the device. In some examples, the listed options for a field may be based on what products are available to the user for the device, including components such as sensor units 210 of the security and automation environment 200. In some examples, the fields may be bold, highlighted, or otherwise different from surrounding text to indicate that the field is selectable or editable. Accordingly, the user interface may enable a user to efficiently program custom rules for the device.

The device may operate according to the custom rules, for example after detecting the person 255 in the zone 245. In some examples, the device may operate in a programmed mode, such as a deter mode, which the user may select at the user interface of the computing device. In an example, when operating in a deter mode, the device may determine (e.g., using the sensor unit 210) whether the person 255 remains in the zone 245 for a threshold duration. If the person 255 does not remain in the zone 245 for the threshold duration, the device may be configured to take no further action. If the person 255 remains in the zone 245 for the threshold duration, the device may perform one or more actions according to the programmed custom rules associated with the deter mode.

In some examples, the device may be configured to take one or more actions upon detecting the person 255 in the zone 245 (e.g., without waiting a threshold duration). For example, the user may select actions to deter or discourage the person 255 from remaining in the zone 245 or approaching the home 250. The device may activate or strobe a light at the sensor unit 210, play an audible indication (e.g., a tone or a verbal announcement) at a speaker of the sensor unit 210, etc. For instance, the actions may include activating one or more light-emitting diode (LED) lights at the sensor unit 210. The LED lights may be colored or non-colored. In some examples, the audible indication may include broadcasting of the audible indication based on a proximity of the person 255 to the home 250.

Figure 3:
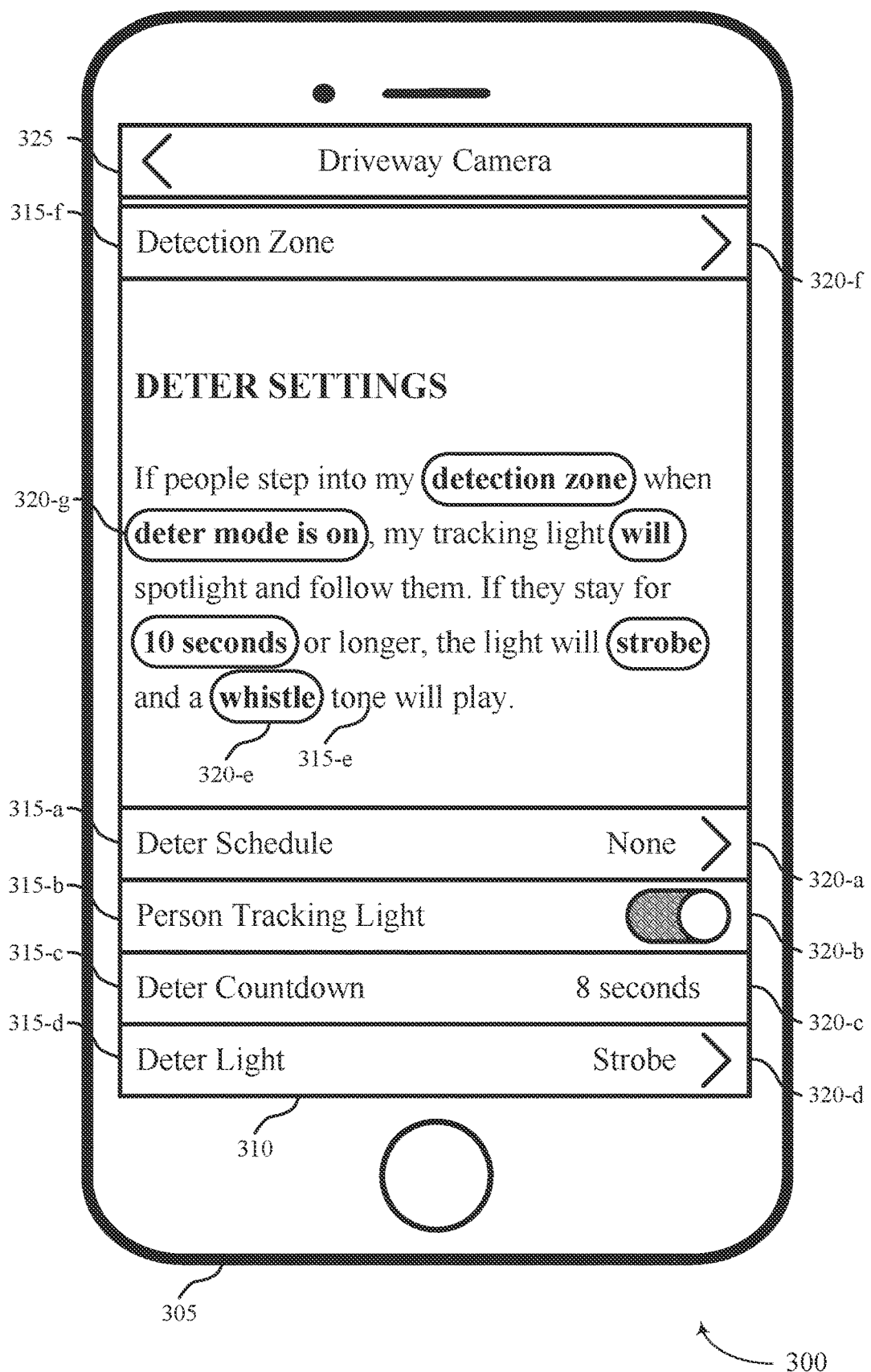
FIG. 3 illustrates an example of a user interface that supports techniques for camera programming in accordance with aspects of the present disclosure.

FIG. 3 illustrates an example of a user interface 300 that supports techniques for camera programming in accordance with aspects of the present disclosure. In some examples, user interface 300 may implement aspects of the system 100. For example, the user interface 300 may be for an application on a computing device 305 and may enable a user to program a device in electronic communication with a security and automation system using a madlib style format. For example, the computing device 305 may output the user interface 300 as part of a graphical user interface (GUI) for communicating with the security and automation system. As illustrated, the user interface 300 may be displayed on the computing device 305, which may be an example of a control panel 135, a local computing device 120, or a remote computing device 140. The user interface 300 may be displayed on a display 310 of the computing device 305. A header 325 may indicate which device of the security and automation system the user is programming with the user interface 300. For example, the header 325 may indicate that the user is programming a driveway camera, a door lock, a security sensor, a thermostat, a garage door opener, or another device of the security and automation system.

The user interface 300 may include several fields of information, including static fields 315 and dynamic fields 320. In some examples, the dynamic fields 320 may be selectable or editable. For example, a user may select a dynamic field 320 to see options for modifying one or more settings for the device. That is, when the user selects a dynamic field 320, the user interface 300 may present a settings screen which may enable the user to modify settings associated with the dynamic field 320. In some examples, the listed options for a dynamic field 320 may be based on what products are available to the user for the device, such as a camera, a motion sensor, a speaker, a control panel, a transceiver, a doorbell, a light, or any combination thereof. In some examples, a dynamic field 320 may be bold, highlighted, or otherwise different from surrounding text to indicate that the dynamic field 320 is selectable or editable. For example, a dynamic field 320-e may be bold and circled to indicate the user may select the dynamic field 320-e to see options for modifying an alarm tone to play at the device. The static fields 315 may provide identifying information for aspects of the user interface 300 to enable the user to effectively program the device using corresponding dynamic fields 320. For example, a static field 315-*a* may indicate that the user may select a corresponding dynamic field 320-*a* to see options of modifying a deter schedule for the device.

A user may program a set of custom rules for operating the device using the user interface 300. For example, as illustrated in FIG. 3, the custom rules may be associated with how the device is to operate after detecting a person in a detection zone. The user may select a deter mode for the detection zone using a dynamic field 320-*g*. When the deter mode is on, the user may program a tracking light using a dynamic field 320-*b* to follow the detected person. The device may determine whether the person remains in the detection zone for a deter countdown, as programmed using a dynamic field 320-*c*. If the person remains in the detection zone for the deter countdown, the user may program the tracking light to strobe using a dynamic field 320-*d*. Additionally or alternatively, the user may program a speaker to emit an alarm tone (e.g., a whistle) using a dynamic field 320-*e*. The user may select the actions to deter or discourage the person from remaining in the detection zone or approaching a home.

In some examples, the user may program additional custom rules using the user interface 300, for example based on detecting one or more trigger events. For example, the device may be configured to take one or more actions based on detecting a car door opening, detecting an animal (e.g., a specific animal such a dog or a rodent, a dangerous animal, or another animal as programmed by the user), detecting aggressive behavior in the detection zone, detecting audio (e.g., screaming, yelling, gunshots, breaking glass, or other sounds), detecting a specified individual (e.g., based on facial recognition or other person recognition processes), or any combination thereof.

Figure 4:
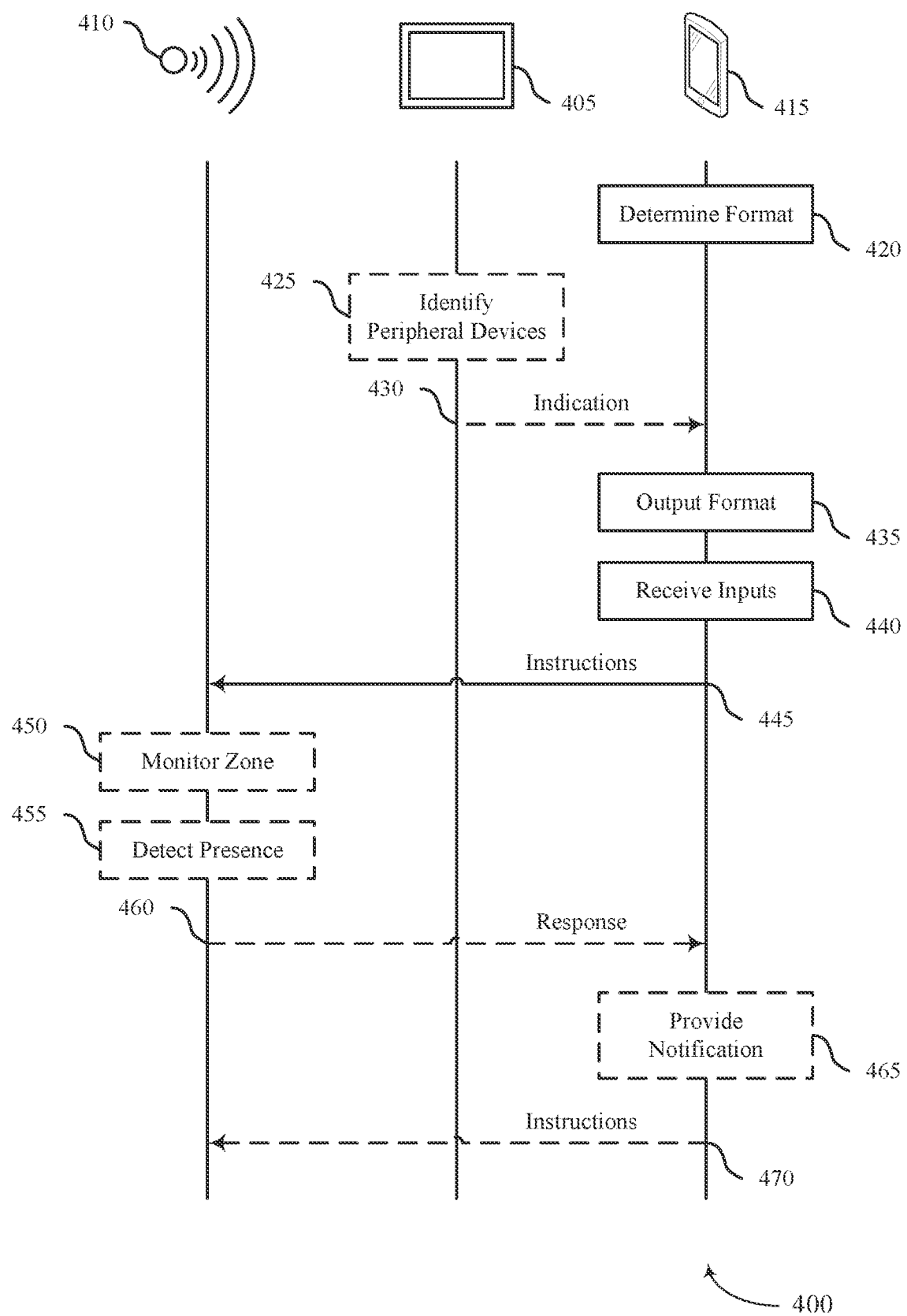
FIG. 4 illustrates an example of a process flow that supports techniques for camera programming in accordance with aspects of the present disclosure.

FIG. 4 illustrates an example of a process flow 400 that supports techniques for camera programming in accordance with aspects of the present disclosure. In some examples, process flow 400 may implement aspects of the system 100. For example, the process flow 400 may include example operations associated with one or more of a control panel 405, a device 410, or a computing device 415, which may be examples of the corresponding devices described with reference to FIG. 1. In the following description of the process flow 400, the operations between the control panel 405, the device 410, and the computing device 415 may be performed in a different order than the example order shown, or the operations performed by the control panel 405, the device 410, and the computing device 415 may be performed in different orders or at different times. Some operations may also be omitted from the process flow 400, and other operations may be added to the process flow 400. In some examples, one or more operations of the process flow 400 performed by the computing device 415 may be performed by a local computing device 120, a server 155, or a remote computing device 140 as described herein. Additionally or alternatively, one or more operations of the process flow 400 performed by the device 410 may be performed by one or more sensor units 110 as described herein. The operations performed by the control panel 405, the device 410, and the computing device 415 may support improvements to intruder detection techniques, among other benefits.

At 420, the computing device 415 may determine a format for programming the device 410, such as a madlib style format. In some examples, at 425 the control panel 405 may identify one or more peripheral devices associated with the device 410. The peripheral devices may include a camera sensor, a motion sensor, a speaker, the control panel 405, a transceiver, a doorbell, a light, a car guard device, a laser tripline, a smart security sign, or any combination thereof. In some examples, at 430 the control panel 405 may transmit an indication of the peripheral devices to the computing device 415, and the computing device 415 may identify the peripheral devices based on receiving the indication.

At 435, the computing device 415 may output a representation of the format to a display of the computing device 415. For example, the computing device 415 may be a smartphone, and the representation of the format may be output using a smartphone application. The representation of the format may include several fields of information in a user interface, such as fields associated with an object detection mode, a deterrence mode, a duration, an alarm tone, a light pattern, a schedule, an initiated action at a component of the security and automation system (e.g., the device 410, the control panel 405, or another component), or any combination thereof. The fields may include static fields and dynamic fields. In some examples, the dynamic fields may be selectable or editable. For example, a user may select a dynamic field to see options for modifying one or more settings for the device 410. In some examples, the listed options for a dynamic field may be based on what products (e.g., peripheral devices) are available to the user for the device 410. In some examples, a dynamic field may be bold, highlighted, or otherwise different from surrounding text to indicate that the dynamic field is selectable or editable.

At 440, the computing device 415 may receive one or more inputs from the user, for example via the user interface on the display of the computing device 415. In some examples, the user may select options for the dynamic fields to program the device 410 using custom rules. At 445, the computing device 415 may transmit instructions to the device 410 based on the received inputs. In some examples, at 450 the device 410 may monitor a zone (e.g., a detection zone) of a premises or a building based on the custom rules indicated in the instructions. At 455 the device 410 may detect a presence in the monitored zone.

At 460, the device 410 may transmit a response to the computing device 415. The response may identify the detected presence, provide an update associated with a peripheral device (e.g., a deactivation or an activation of a peripheral device), or otherwise include additional information for the computing device 415. At 465, the computing device 415 may provide a notification based on the received response. The notification may include an updated representation of the format, for example, based on the detected presence, the update associated with the peripheral device, the additional information, or any combination thereof. In some examples, the notification may include a text message, a confirmation message, an audio message, a visual notification, or any combination thereof.

At 470, the computing device 415 may transmit updated instructions to the device 410, for example based on the notification or a response to the notification received from the user. The operations performed by the device 410, the control panel 405, and the computing device 415 may enable the user to efficiently program custom rules for the device 410, among other benefits.

Figure 5:
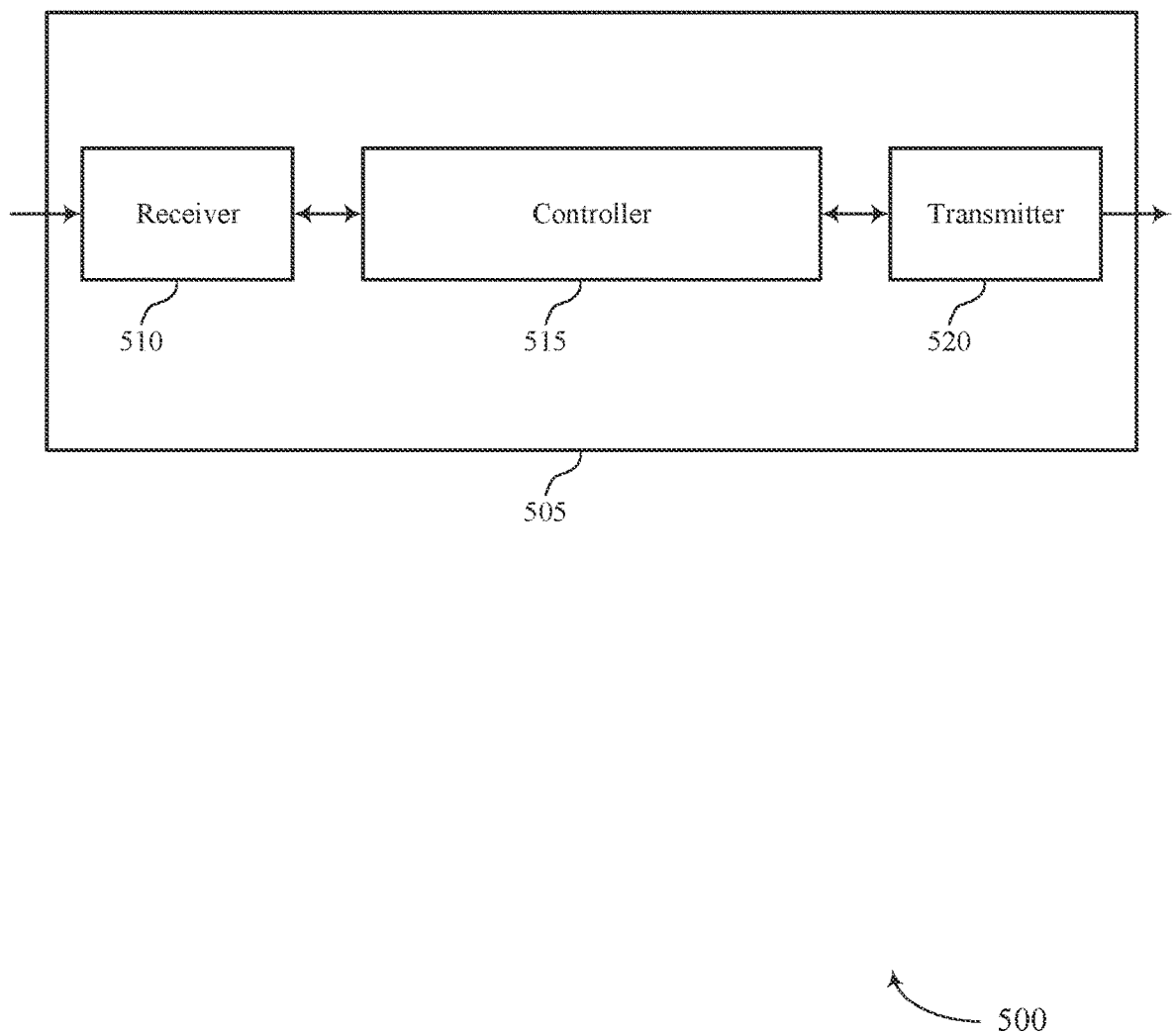
FIGS. 5 and 6 show block diagrams of devices that support techniques for camera programming in accordance with aspects of the present disclosure.

FIG. 5 shows a block diagram 500 of a computing device 505 that supports techniques for camera programming in accordance with aspects of the present disclosure. The computing device 505 may be an example of aspects of a control panel 135, a local computing device 120, a server 155, or a remote computing device 140 as described herein. The computing device 505 may include a receiver 510, a controller 515, and a transmitter 520. The computing device 505 may also include a processor. Each of these components may be in communication with one another (e.g., via one or more buses).

The receiver 510 may receive information such as packets, user data, or control information associated with various information channels (e.g., control channels, data channels, and information related to techniques for camera programming, etc.). Information may be passed on to other components of the computing device 505. The receiver 510 may be an example of aspects of the transceiver 820 described with reference to FIG. 8. The receiver 510 may utilize a single antenna or a set of antennas.

The controller 515 may support techniques for programming a device associated with a security and automation system. The controller 515 may determine a format for programming the device, output, via an interface, a representation of the format, the format including a first set of fields and a second set of fields including one or more selectable options for each field of the second set of fields, receive, via the interface, one or more inputs corresponding to the one or more selectable options for each field of the second set of fields, and transmit instructions to the device for programming the device based on the one or more inputs. The controller 515 may be an example of aspects of the controller 810 described herein.

The controller 515, or its sub-components, may be implemented in hardware, code (e.g., software or firmware) executed by a processor, or any combination thereof. If implemented in code executed by a processor, the functions of the controller 515, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The controller 515, or its sub-components, may be physically located at various positions, including being distributed such that portions of functions are implemented at different physical locations by one or more physical components. In some examples, the controller 515, or its sub-components, may be a separate and distinct component in accordance with various aspects of the present disclosure. In some examples, the controller 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the computing device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
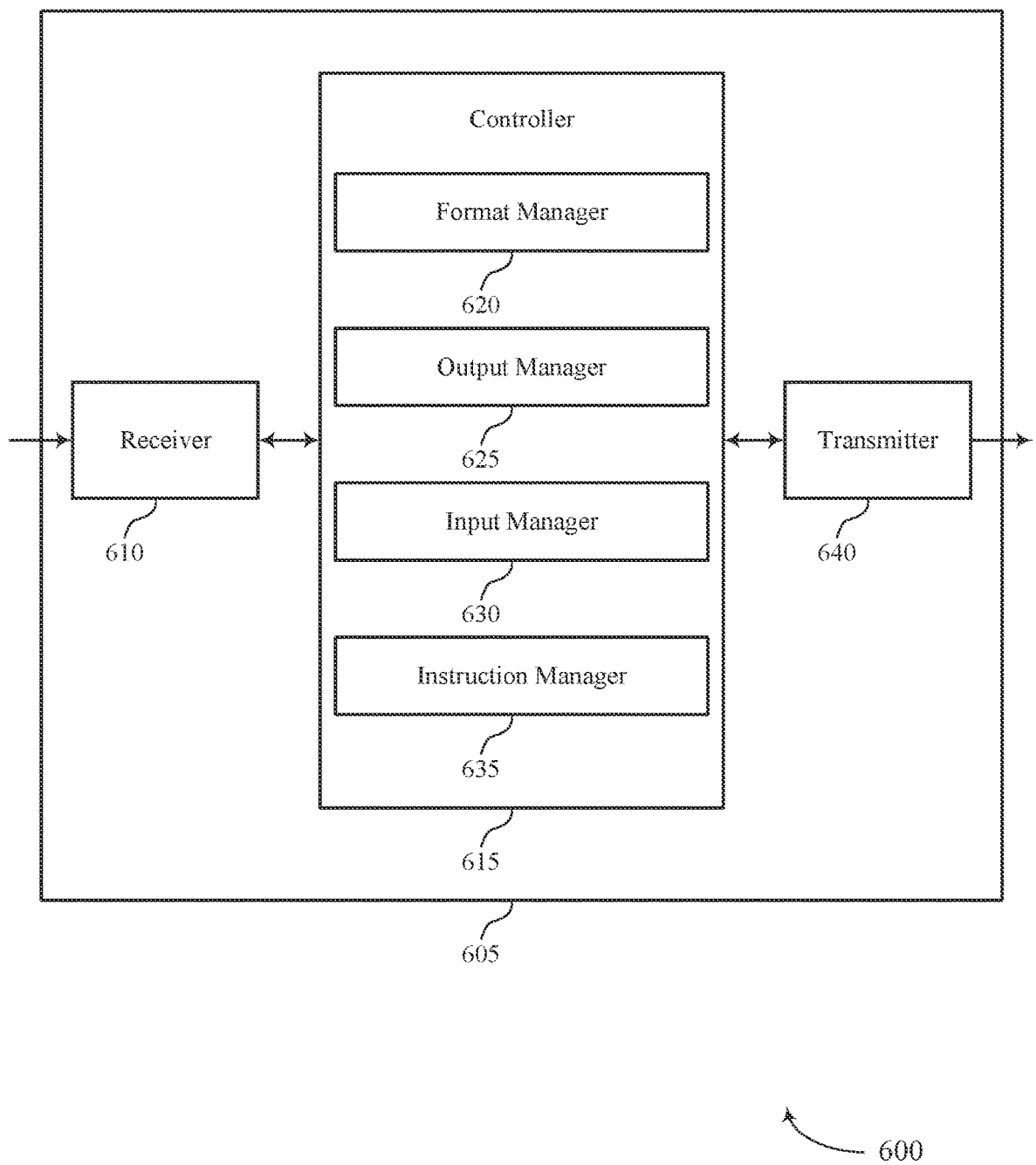

FIG. 6 shows a block diagram 600 of a computing device 605 that supports techniques for camera programming in accordance with aspects of the present disclosure. The computing device 605 may be an example of aspects of a computing device 505 a control panel 135, a local computing device 120, a server 155, or a remote computing device 140 as described herein. The computing device 605 may include a receiver 610, a controller 615, and a transmitter 640. The computing device 605 may also include a processor. Each of these components may be in communication with one another (e.g., via one or more buses).

The receiver 610 may receive information such as packets, user data, or control information associated with various information channels (e.g., control channels, data channels, and information related to techniques for camera programming, etc.). Information may be passed on to other components of the computing device 605. The receiver 610 may be an example of aspects of the transceiver 820 described with reference to FIG. 8. The receiver 610 may utilize a single antenna or a set of antennas.

The controller 615 may be an example of aspects of the controller 515 as described herein. The controller 615 may include a format manager 620, an output manager 625, an input manager 630, and an instruction manager 635. The controller 615 may be an example of aspects of the controller 810 described herein. The controller 615 may support techniques for programming a device associated with a security and automation system The format manager 620 may determine a format for programming the device. The output manager 625 may output, via an interface, a representation of the format, the format including a first set of fields and a second set of fields including one or more selectable options for each field of the second set of fields. The input manager 630 may receive, via the interface, one or more inputs corresponding to the one or more selectable options for each field of the second set of fields. The instruction manager 635 may transmit instructions to the device for programming the device based on the one or more inputs.

The transmitter 640 may transmit signals generated by other components of the computing device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
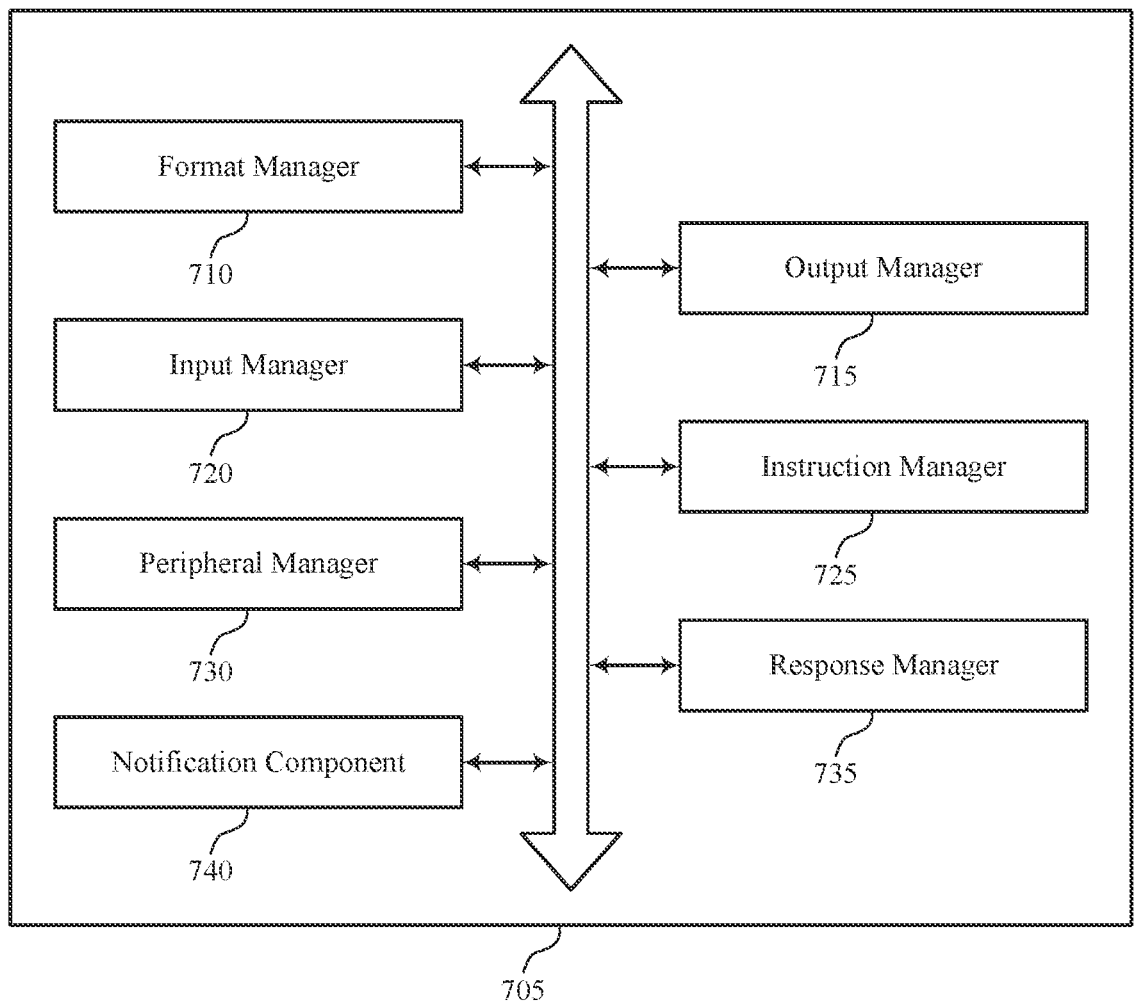
FIG. 7 shows a block diagram of a controller that supports techniques for camera programming in accordance with aspects of the present disclosure.

FIG. 7 shows a block diagram 700 of a controller 705 of a computing device that supports techniques for camera programming in accordance with aspects of the present disclosure. The controller 705 may be an example of aspects of a controller 515, a controller 615, or a controller 810 described herein. The controller 705 may include a format manager 710, an output manager 715, an input manager 720, an instruction manager 725, a peripheral manager 730, a response manager 735, and a notification component 740. Each of these modules may communicate, directly or indirectly, with one another (e.g., via one or more buses).

The format manager 710 may determine a format for programming a device. In some cases, the device may include a camera-enabled device configured for monitoring, detection, deterrence, recording, communication, notification, or any combination thereof. In some cases, the camera-enabled device may be positioned on an exterior surface of a building. In some cases, the device may include a door lock, a security sensor, a thermostat, a garage door opener, or any combination thereof. In some cases, the computing device may include a smartphone. The output manager 715 may output, via an interface, a representation of the format, the format including a first set of fields and a second set of fields including one or more selectable options for each field of the second set of fields. In some cases, the representation of the format may be provided using an application at the smartphone. In some cases, a text format of the second set of fields in the representation of the format may indicate the second set of fields are selectable or editable. In some cases, the second set of fields may be associated with an object detection mode, a deterrence mode, a duration, an alarm tone, a light pattern, a schedule, an initiated action at a component of the security and automation system, or any combination thereof.

The input manager 720 may receive, via the interface, one or more inputs corresponding to the one or more selectable options for each field of the second set of fields. The instruction manager 725 may transmit instructions to the device for programming the device based on the one or more inputs. In some examples, the instruction manager 725 may determine a second notification based on determining the person has remained in the zone for the threshold duration. In some examples, the instruction manager 725 may transmit the second notification to one or more devices associated with the security and automation system. In some examples, the instruction manager 725 may receive a response to the second notification. In some examples, the instruction manager 725 may generate a third audiovisual notification based on receiving the response.

The peripheral manager 730 may identify one or more peripheral devices associated with programming the device, where outputting the representation of the format may be based on identifying the one or more peripheral devices. In some cases, the one or more peripheral devices may include a camera sensor, a motion sensor, a speaker, a control panel, a transceiver, a doorbell, a light, a car guard device, a laser tripline, a smart security sign, or any combination thereof. The response manager 735 may receive, from the device, a response based on the transmitted instructions. The notification component 740 may provide, at the computing device, a notification based on the received response. In some cases, the notification may include an updated representation of the format at the interface of the computing device, the updated representation based on the received response. In some cases, the notification may include a text message, a confirmation message, an audio message, a visual notification, or any combination thereof.

Figure 8:
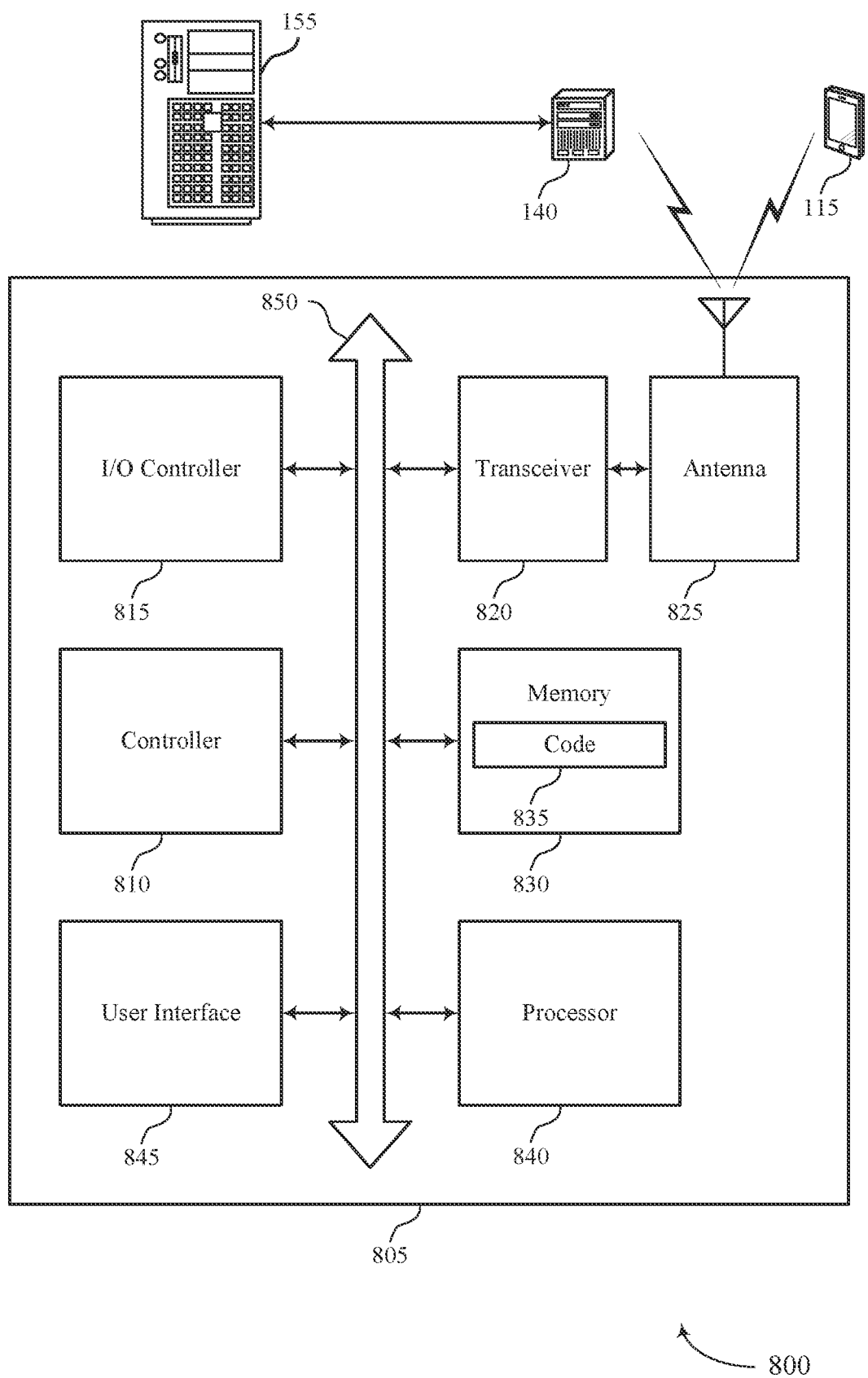
FIG. 8 shows a diagram of a system including a device that supports techniques for camera programming in accordance with aspects of the present disclosure.

FIG. 8 shows a diagram of a system 800 including a computing device 805 that supports techniques for camera programming in accordance with aspects of the present disclosure. The computing device 805 may be an example of or include the components of computing device 505, computing device 605, or a control panel 135, a local computing device 120, a server 155, or a remote computing device 140 as described herein. The computing device 805 may include components for bi-directional voice and data communications including components for transmitting and receiving communications, including a controller 810, an I/O controller 815, a transceiver 820, an antenna 825, memory 830, a processor 840, and a user interface 845. These components may be in electronic communication via one or more buses (e.g., bus 850).

In some cases, the computing device 805 may communicate with a remote computing device 140, and/or a remote server (e.g., a server 155). For example, one or more elements of the computing device 805 may provide a direct connection to the server 155 via a direct network link to the Internet via a POP (point of presence). In some cases, one element of the computing device 805 (e.g., one or more antennas, transceivers, etc.) may provide a connection using wireless techniques, including digital cellular telephone connection, Cellular Digital Packet Data (CDPD) connection, digital satellite data connection, and/or another connection.

Many other devices and/or subsystems may be connected to one or may be included as one or more elements of the system 800 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some cases, all of the elements shown in FIG. 8 need not be present to practice the present systems and methods. The devices and subsystems may also be interconnected in different ways from that shown in FIG. 8. In some cases, an aspect of the operations of the system 800 may be readily known in the art and are not discussed in detail in this disclosure.

The signals associated with the system 800 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G, Long Term Evolution (LTE), and/or New Radio (NR), for example), and/or other signals. The radio access technology (RAT) of the system 800 may be related to, but are not limited to, wireless wide area network (WWAN) (GSM, CDMA, and WCDMA), wireless local area network (WLAN) (including user equipment (UE) BLUETOOTH® and Wi-Fi), WMAN (WiMAX), antennas for mobile communications, antennas for Wireless Personal Area Network (WPAN) applications (including RFID and UWB). In some cases, one or more sensors (e.g., motion, proximity, smoke, light, glass break, door, window, carbon monoxide, and/or another sensor) may connect to some element of the system 800 via a network using the one or more wired and/or wireless connections.

The controller 810 may determine a format for programming a device, output, via an interface, a representation of the format, the format including a first set of fields and a second set of fields including one or more selectable options for each field of the second set of fields, receive, via the interface, one or more inputs corresponding to the one or more selectable options for each field of the second set of fields, and transmit instructions to the device for programming the device based on the one or more inputs.

The I/O controller 815 may manage input and output signals for the computing device 805. The I/O controller 815 may also manage peripherals not integrated into the computing device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem or a similar device. In some cases, the I/O controller 815 may be implemented as part of a processor. In some cases, a user may interact with the computing device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the computing device 805 may include a single antenna 825. However, in some cases, the computing device 805 may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the computing device 805 to perform various functions (e.g., functions or tasks supporting techniques for camera programming).

The code 835 may include instructions to implement aspects of the present disclosure, including instructions to support intruder detection. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The user interface 845 may enable a user to interact with the computing device 805. In some cases, the user interface 845 may include an audio device, such as an external speaker system. In some cases the user interface 845 may include a keyboard, a mouse, a touchscreen, an external display device such as a display screen, or an input device (e.g., a remote control device interfaced with the user interface 845 directly or through the I/O controller 815).

Figure 9:
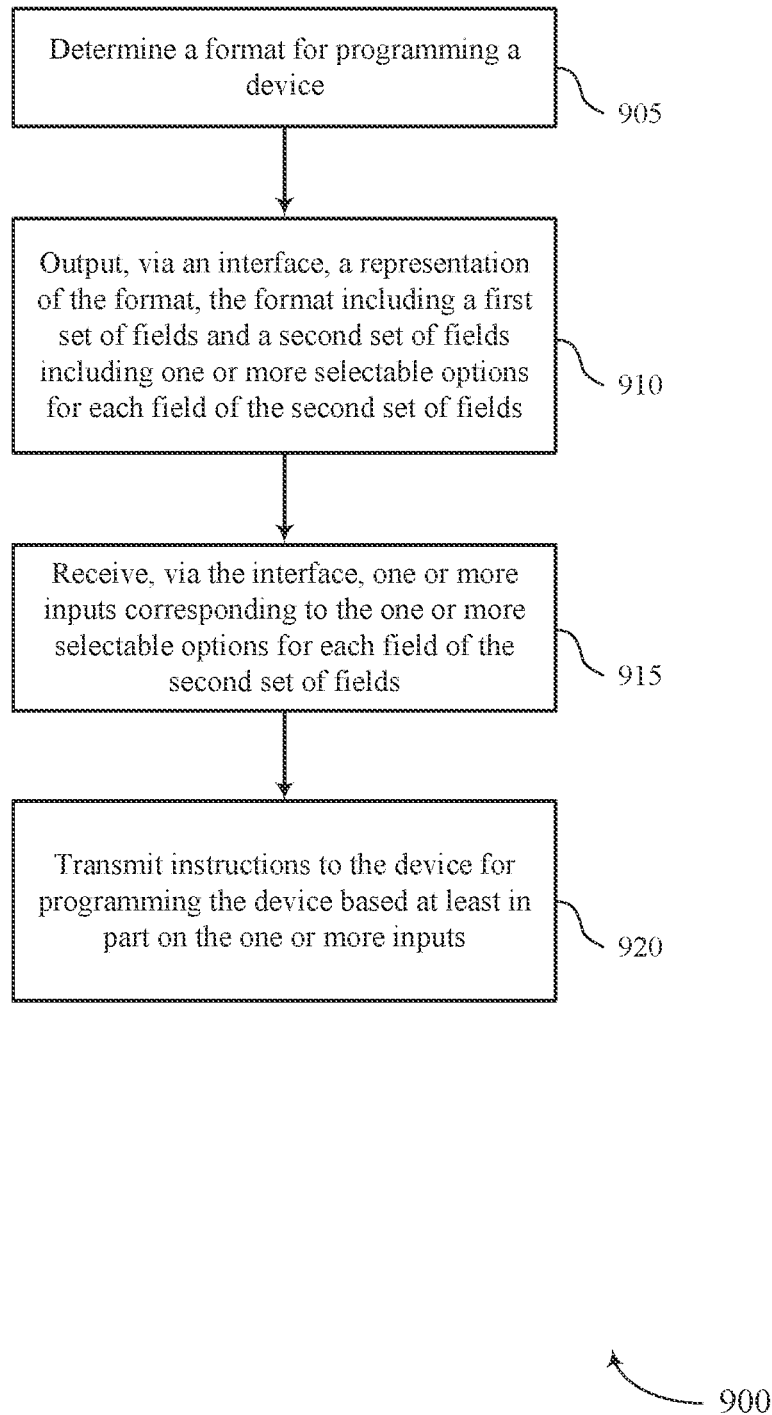
FIG. 9 shows a flowchart illustrating a method that supports techniques for camera programming in accordance with aspects of the present disclosure.

FIG. 9 shows a flowchart illustrating a method 900 that supports techniques for camera programming in accordance with aspects of the present disclosure. The operations of method 900 may be implemented by a computing device of a security and automation system (e.g., a control panel 135, a local computing device 120, a server 155, or a remote computing device 140) or its components as described herein. For example, the operations of method 900 may be performed by a controller as described with reference to FIGS. 5 through 8. In some examples, a computing device may execute a set of instructions to control the functional elements of the device to perform the functions described below. Additionally or alternatively, a computing device may perform aspects of the functions described below using special-purpose hardware.

At 905, the computing device may determine a format for programming a device. The operations of 905 may be performed according to the methods described herein. In some examples, aspects of the operations of 905 may be performed by a format manager as described with reference to FIGS. 5 through 8.

At 910, the computing device may output, via an interface, a representation of the format, the format including a first set of fields and a second set of fields including one or more selectable options for each field of the second set of fields. The operations of 910 may be performed according to the methods described herein. In some examples, aspects of the operations of 910 may be performed by an output manager as described with reference to FIGS. 5 through 8.

At 915, the computing device may receive, via the interface, one or more inputs corresponding to the one or more selectable options for each field of the second set of fields. The operations of 915 may be performed according to the methods described herein. In some examples, aspects of the operations of 915 may be performed by an input manager as described with reference to FIGS. 5 through 8.

At 920, the computing device may transmit instructions to the device for programming the device based on the one or more inputs. The operations of 920 may be performed according to the methods described herein. In some examples, aspects of the operations of 920 may be performed by an instruction manager as described with reference to FIGS. 5 through 8.

The detailed description set forth herein in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration. An operating system utilized by the processor (or by I/O controller module or another module described above) may be iOS®, ANDROID®, MS-DOS®, MS-WINDOWS®, OS/2®, UNIX®, LINUX®, or another known operating system.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some cases, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various cases have been described and/or illustrated here in the context of fully functional computing systems, one or more of these exemplary cases may be distributed as a program product in a variety of forms, regardless of the particular type of computer-readable media used to actually carry out the distribution. The cases disclosed herein may also be implemented using software modules that perform certain tasks. These software modules may include script, batch, or other executable files that may be stored on a computer-readable storage medium or in a computing system. In some cases, these software modules may permit and/or instruct a computing system to perform one or more of the exemplary cases disclosed here.

This description, for purposes of explanation, has been described with reference to specific cases. The illustrative discussions above, however, are not intended to be exhaustive or limit the present systems and methods to the precise forms discussed. Many modifications and variations are possible in view of the above teachings. The cases were chosen and described in order to explain the principles of the present systems and methods and their practical applications, to enable others skilled in the art to utilize the present systems, apparatus, and methods and various cases with various modifications as may be suited to the particular use contemplated.

What is claimed is:

1. A method for programming a device associated with a security and automation system, the method being performed by a computing device comprising at least one processor, the method comprising:

determining a format for programming the device;

outputting, via an interface of the computing device, a representation of the format for programming the device, the representation including a first set of fields and a second set of fields including one or more selectable options for each field of the second set of fields, the second set of fields organized in a madlib style in which at least one dynamic field corresponds to a target text of the madlib style with a non-selectable corresponding context portion displayed proximate the at least one dynamic field to provide context to the one or more selectable options of the at least one dynamic field;

receiving, via the interface of the computing device, one or more inputs corresponding to the one or more selectable options for each field of the second set of fields displayed in the madlib style;

determining, based at least in part on the one or more inputs and the format, one or more rules for execution by the device, the one or more rules comprising an action to be performed by the device in response to the security and automation system detecting an event; and transmitting instructions to the device for programming the device based at least in part on the one or more rules.

2. The method of claim 1, further comprising:
identifying one or more peripheral devices associated with programming the device, wherein outputting the representation of the format is based at least in part on identifying the one or more peripheral devices.

3. The method of claim 2, wherein the one or more peripheral devices comprise a camera sensor, a motion sensor, a speaker, a control panel, a transceiver, a doorbell, a light, a car guard device, a laser tripline, a smart security sign, or any combination thereof.

4. The method of claim 1, further comprising:
receiving, from the device, a response based at least in part on the transmitted instructions; and
providing, at the computing device, a notification based at least in part on the received response.

5. The method of claim 4, wherein the notification comprises an updated representation of the format at the interface of the computing device, the updated representation based at least in part on the received response.

6. The method of claim 4, wherein the notification comprises a text message, a confirmation message, an audio message, a visual notification, or any combination thereof.

7. The method of claim 1, wherein a text format of the second set of fields in the representation of the format indicates the second set of fields are selectable or editable.

8. The method of claim 1, wherein the second set of fields are associated with an object detection mode, a deterrence mode, a duration, an alarm tone, a light pattern, a schedule, an initiated action at a component of the security and automation system, or any combination thereof.

9. The method of claim 1, wherein the device comprises a camera-enabled device configured for monitoring, detection, deterrence, recording, communication, notification, or any combination thereof.

10. The method of claim 9, wherein the camera-enabled device is positioned on an exterior surface of a building.

11. The method of claim 1, wherein the device comprises a door lock, a security sensor, a thermostat, a garage door opener, or any combination thereof.

12. The method of claim 1, wherein:
the computing device comprises a smartphone; and
the representation of the format is provided using an application at the smartphone.

13. The method of claim 1,
wherein the determined format comprises a first set of static fields and a second set of dynamic fields, and
wherein the first set of fields provides identifying information for a corresponding field of the second set of fields.

14. The method of claim 1, further comprising:
generating a set of custom device rules based at least in part on the one or more inputs; and
transmitting the set of custom device rules to the device for programming the device.

15. An apparatus for programming a device associated with a security and automation system, comprising:
a processor;
memory coupled with the processor;
an interface coupled with the processor and the memory; and
instructions stored in the memory and executable by the processor to cause the apparatus to:

determine a format for programming the device;
output, via the interface, a representation of the format for programming the device, the representation including a first set of fields and a second set of fields including one or more selectable options for each field of the second set of fields, the second set of fields organized in a madlib style in which at least one dynamic field corresponds to a target text of the madlib style with a non-selectable corresponding context portion displayed proximate the at least one dynamic field to provide context to the one or more selectable options of the at least one dynamic field;
receive, via the interface, one or more inputs corresponding to the one or more selectable options for each field of the second set of fields displayed in the madlib style;
determine, based at least in part on the one or more inputs and the format, one or more rules for execution by the device, the one or more rules comprising an action to be performed by the device in response to the security and automation system detecting and event; and
transmit instructions to the device for programming the device based at least in part on the one or more rules.

16. The apparatus of claim 15, wherein the instructions are further executable by the processor to cause the apparatus to:
identify one or more peripheral devices associated with programming the device, wherein to output the representation of the format is based at least in part on identifying the one or more peripheral devices.

17. The apparatus of claim 15, wherein the instructions are further executable by the processor to cause the apparatus to:
receive, from the device, a response based at least in part on the transmitted instructions; and
provide, via the interface, a notification based at least in part on the received response.

18. The apparatus of claim 15, wherein a text format of the second set of fields in the representation of the format indicates the second set of fields are selectable or editable.

19. The apparatus of claim 15, wherein the second set of fields are associated with an object detection mode, a deterrence mode, a duration, an alarm tone, a light pattern, a schedule, an initiated action at a component of the security and automation system, or any combination thereof.

20. A non-transitory computer-readable medium storing code for programming a device associated with a security and automation system, the code comprising instructions executable by a processor of a computing device to:
determine a format for programming the device;
output, via an interface of the computing device, a representation of the format for programming the device, the representation including a first set of fields and a second set of fields including one or more selectable options for each field of the second set of fields, the second set of fields organized in a madlib style in which at least one dynamic field corresponds to a target text of the madlib style with a non-selectable corresponding context portion displayed proximate the at least one dynamic field to provide context to the one or more selectable options of the at least one dynamic field;
receive, via the interface of the computing device, one or more inputs corresponding to the one or more selectable options for each field of the second set of fields displayed in the madlib style;

determine, based at least in part on the one or more inputs and the format, one or more rules for execution by the device, the one or more rules comprising an action to be performed by the device in response to the security and automation system detecting and event; and
transmit instructions to the device for programming the device based at least in part on the one or more rules.

* * * * *